(12) United States Patent
Bell et al.

(10) Patent No.: US 6,485,389 B1
(45) Date of Patent: Nov. 26, 2002

(54) MECHANICAL DIFFERENTIAL GEAR ASSEMBLY

(75) Inventors: Douglas W. Bell, Mattoon, IL (US); David R. Hinton, Mt. Zion, IL (US); Marcus D. Bunnow, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 56 days.

(21) Appl. No.: 09/713,809

(22) Filed: Nov. 15, 2000

(51) Int. Cl.7 .............................................. F16H 48/06
(52) U.S. Cl. ........................ 475/230; 74/607; 180/312
(58) Field of Search ......................... 475/230; 74/607; 301/124.1, 130; 384/490–589, 455; 180/312

(56) References Cited

U.S. PATENT DOCUMENTS

| | | | |
|---|---|---|---|
| 1,057,466 A | * | 4/1913 | Taylor |
| 2,341,981 A | | 2/1944 | Davids |
| 2,561,335 A | * | 7/1951 | Buckendale |
| 2,731,855 A | | 1/1956 | Schmal |
| 2,749,766 A | * | 6/1956 | Blair ............................ 74/379 |
| 2,786,367 A | * | 3/1957 | Rockwell |
| 2,903,973 A | | 9/1959 | Lewis |
| 3,175,417 A | | 3/1965 | May |
| 3,672,019 A | | 6/1972 | Barnbrook et al. |
| 3,890,015 A | | 6/1975 | Harbottle |
| 4,034,621 A | | 7/1977 | Ritter, Jr. |
| 4,611,505 A | * | 9/1986 | Cronin et al. ................. 475/23 |
| 4,651,587 A | | 3/1987 | Anderson et al. |
| 4,754,847 A | * | 7/1988 | Glaze et al. ................ 184/6.12 |
| 5,021,035 A | | 6/1991 | Zhou |
| 5,098,355 A | | 3/1992 | Long |
| 5,203,750 A | * | 4/1993 | Oster et al. .................. 475/220 |
| 5,239,880 A | | 8/1993 | Hawkins et al. |
| 5,261,750 A | * | 11/1993 | Eckhardt et al. ............. 384/455 |
| 5,269,731 A | * | 12/1993 | Scudder et al. ............. 475/230 |
| 5,286,239 A | * | 2/1994 | Ito et al. ........................ 192/49 |
| 5,735,612 A | | 4/1998 | Fox et al. |
| 5,806,371 A | * | 9/1998 | Hibbler et al. ............... 475/230 |
| 5,816,711 A | | 10/1998 | Gingrich |
| 6,024,666 A | | 2/2000 | Bunnow |
| 6,227,716 B1 | * | 5/2001 | Irwin .......................... 384/583 |

* cited by examiner

Primary Examiner—Rodney H Bonck
Assistant Examiner—David D. Le
(74) Attorney, Agent, or Firm—Thomas L. Derry

(57) ABSTRACT

A mechanical differential assembly having an increased bearing load zone capacity. The mechanical gear assembly maintains a proper load capacity of rollers of the bearings which support a differential gear assembly. The mechanical differential assembly thus maintains alignment of the inner and outer races of the bearings regardless of an axial force placed on the bearings, any loads placed on the differential gear assembly or the like during driving condition. The mechanical differential assembly includes a differential gear assembly supported on a first end by a cylindrical bearing and supported on the second end by a pair of tapered bearings.

19 Claims, 3 Drawing Sheets

MECHANICAL DIFFERENTIAL GEAR ASSEMBLY

TECHNICAL FIELD

This invention relates generally to a mechanical differential assembly and, more particularly, to a mechanical differential assembly having increased bearing load zone capacity.

BACKGROUND ART

Machines such as earth working machinery, paving machinery, load transfer carrying machinery and the like use differential assemblies in order to transfer power from a transmission to driving wheels. The differential assembly, in the most general form, consists of an arrangement of gears, bearings and a carrier provided within a rear axle casing of the machine. In operation, an output shaft of the transmission transmits an output torque to a bevel pinion gear of the differential assembly which, in turn, transmits the torque to driving wheel shafts for driving the machine.

More specifically, a typical differential assembly includes a bevel pinion gear which is coupled to the output shaft of the transmission. A pair of tapered roller bearings supports the bevel pinion gear. The tapered roller bearings permit the bevel pinion gear to freely rotate about the longitudinal axis of the output shaft of the transmission. The bevel pinion gear meshes with a bevel ring or crown gear that is coupled to a differential gear assembly. The differential gear assembly as well as the bevel pinion gear are housed within a carrier. The driving shafts of the driving wheels extend through a centrally located bore of the differential gear assembly. The differential gear assembly permits the driving wheels to rotate independently of each other such as when turning a corner or traversing an uneven road.

The differential gear assembly is supported by two opposing tapered roller bearings, each at opposing ends of the differential gear assembly. These tapered roller bearings permit rotation of the differential gear assembly, and are typically referred to as a bevel gear heel bearing and a bevel gear toe bearing. The toe bearing is typically smaller than the heel bearing. In order to function properly, it is critical that the tapered bearings be properly pre-loaded thus ensuring that the differential gear assembly is held in proper alignment and is free to rotate about the longitudinal axis of both of the driving shafts during the rotation of the differential gear assembly. The pre-loading of the tapered roller bearings also ensures that both of the tapered bearings are properly loaded during the operation of the machine. In this manner and with the proper pre-loading, the tapered bearings contribute to the performance of the differential gear assembly and hence the machine.

The pre-loading of the tapered bearings is of critical importance, where an improper pre-loading may result in a misalignment of the inner and outer races of either or both of the tapered roller bearings. Improper pre-load may also result in one or both of the tapered bearings operating with a diminished load zone, i.e., where only a few rollers of the tapered bearings carry the entire load imposed by the differential gear assembly during rotation thereof. This may then result in a potential roller overload thus causing a failure of one or both of the tapered roller bearings.

Pre-loading may be affected by many different environmental factors, all of which are important. First, pre-loading of the tapered bearings may be affected by a load placed on the machine, as well as the operating environment of the machine. Both of these conditions may result in a deflection of the carrier which houses the differential gear assembly. This deflection will then place a load on one or both of the tapered bearings thereby affecting the pre-loading, e.g., (i) negating the pre-load or (ii) adding further to the pre-load. In either situation, the pre-load will be influenced thus increasing the potential of failure of the bearings due to a diminished load zone.

A high torque output of the transmission output shaft also affects the loading of the tapered bearings. This is because an axial force will be placed on the differential gear assembly. In this case, the load on the heel bearing will increase and simultaneously unload the opposing toe bearing such that the toe bearing will operate with only a few of the rollers carrying the entire load of the differential gear assembly thus causing a bearing overload. This may result in a premature failure of either the heel or toe bearing. Another condition may simply be an improper pre-loading adjustment of the tapered bearings, or the tolerances of the casing or differential housing being improperly machined.

U.S. Pat. No. 3,175,417 to May, issued on Mar. 30, 1965, shows an axial carrier unit. In this unit, a differential gear assembly is positioned within a carrier and tapered roller bearings support the differential housing for rotation on opposing sides thereof. A bevel pinion gear meshes with a ring gear of the differential gear assembly. In this arrangement, the tapered bearings and more specifically the inner and outer races of the opposing tapered bearings are prone to misalignment due to deflections on the carrier and other loads placed thereon such as axial forces generated by the bevel pinion gear. This misalignment, in turn, results in a diminished load capacity of one or both of the tapered bearings and thus failure of the system.

The axial carrier unit disclosed in U.S. Pat. No. 3,175,417 also includes a stub shaft for connecting to a drive shaft via a coupling. The stub shaft is supported for rotation by a single roller bearing arrangement mounted at the forward end of the shaft and by a pair of tapered roller bearings mounted at the rear end of the shaft. These bearings do not carry the same loads as the tapered bearings which support the differential gear assembly, and thus the same considerations such as, for example, housing deflections which affect the loading of the tapered bearings supporting the differential gear assembly, are of no concern. Also, it is noted that the stub shaft has a different configuration than the differential gear assembly and thus has different loading, weight, torque and the like requirements.

The present invention is directed to overcoming one or more of the problems or disadvantages associated with the prior art.

DISCLOSURE OF THE INVENTION

In one aspect of the present invention a differential assembly has a differential gear assembly having a first end and a second end. A cylindrical bearing supports the first end of the differential gear assembly and a pair of tapered bearings support the second end of the differential gear assembly. Bearing cages retain the cylindrical bearing and the pair of tapered bearings on the carrier assembly.

In another aspect of the present invention, a differential assembly has a differential gear assembly and a ring gear mounted thereon. A cylindrical bearing supports the differential gear assembly at the first end and a first bearing cap retains the cylindrical bearing about the first end of the differential gear assembly. An inner and an outer tapered bearing support a second end of the differential gear assembly. A second bearing cap retains an adapter bearing cage which in turn receives the inner tapered bearing and the outer tapered bearing on the second end of the differential gear assembly.

In still another aspect of the present invention, a method of maintaining a load zone capacity in a differential assembly during driving conditions includes generating a thrust load on a differential gear assembly, transferring the thrust load to a pair of tapered roller bearings thereby eliminating axial forces on a cylindrical bearing.

In yet another aspect of the present invention a machine having a rear axle is coupled to a differential assembly. The machine includes a rear axle housing having a bore and a differential gear assembly having a first end and a second end mounted within the bore. A cylindrical bearing supports the first end of the differential gear assembly and a pair of tapered bearings support the second end of the differential gear assembly. A first bearing cap retains the cylindrical bearing about the first end of the differential gear assembly and a second bearing cap supports a adapter bearing cage which in turn supports an inner and outer tapered bearing at the second end of the differential gear assembly.

BEST MODE FOR CARRYING OUT THE INVENTION

Figure 1:
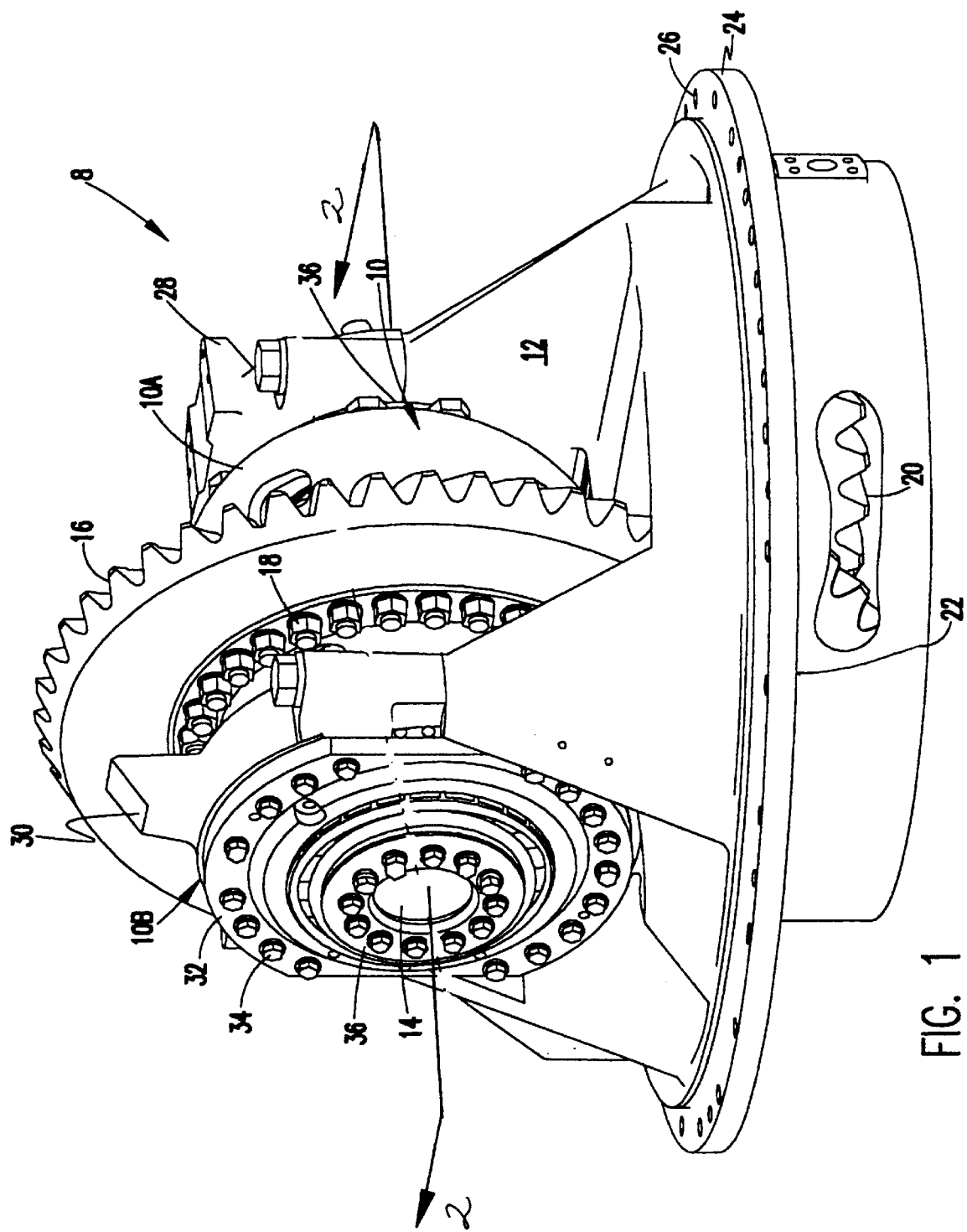
FIG. 1 shows a diagrammatic isometric plan view of the differential assembly of the present invention.

FIG. 1 shows a diagrammatic isometric view of the differential assembly generally depicted as reference numeral 8. The differential assembly 8 includes a differential gear assembly 10 having a first end 10a and a second end 10b. A bore 14 is positioned at both the first end 10a and the second end 10b, respectively, of the differential gear assembly 10. A bevel ring gear 16 is coupled to a differential gear assembly 10 preferably by bolts 18. The bevel ring gear 16 meshes with a bevel pinion gear 20 which is supported in a carrier assembly 12 by tapered bearings (not shown). The carrier assembly 12 includes a flange 24 which has a plurality of apertures 26 thereabout.

Still referring to FIG. 1, the differential gear assembly 10 is mounted to the carrier assembly 12 at the first end 10a by a first bearing cap 28 and at the second end 10b by a second bearing cap 30. An adapter bearing cage 32 is mounted about the bore 14 of the carrier 12 to the second bearing cap 30.

The adapter bearing cage 32 is preferably bolted to the second bearing cap 30 via bolts 34, and should preferably have a substantially same outer diameter as the inner diameter of the second bearing cap 30. A retainer plate 36 is bolted to the differential gear assembly 10 outboard of the second end 10b of the differential gear assembly 10.

Figure 2:
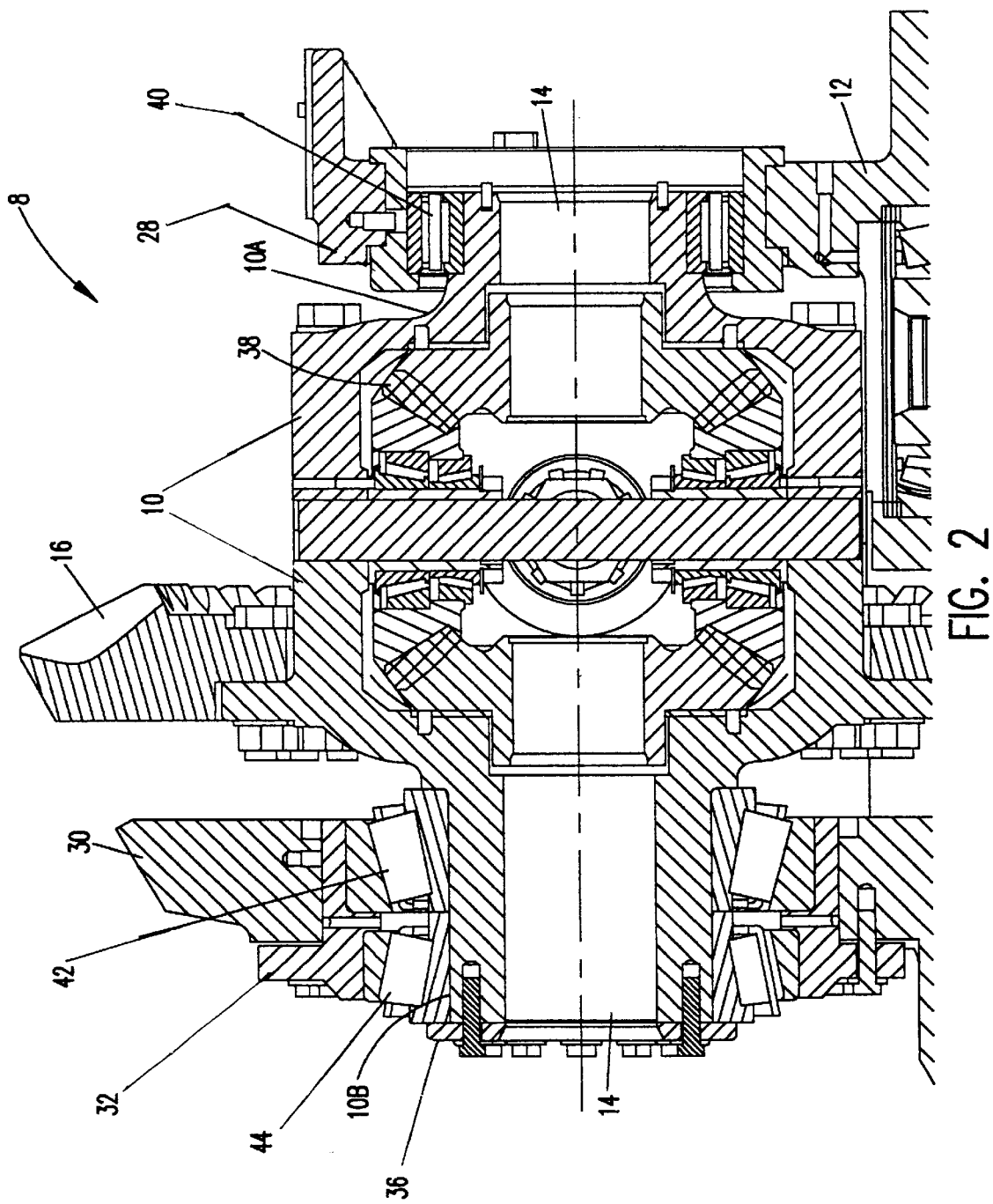
FIG. 2 shows a side cut-away view of the differential assembly along line 2—2 of FIG. 1.

FIG. 2 shows a cut-away view of the differential assembly 8 along line 2—2 of FIG. 1. As seen in FIG. 2, the carrier 12 includes the opposing bores 14 positioned at the respective ends 10a and 10b of the differential gear assembly 10. An inner gear and bearing assembly 38 is positioned within the differential gear assembly 10. A cylindrical bearing 40 (generally known as the toe bearing) is positioned at the first end 10a of the differential gear assembly 10. The cylindrical bearing 40 is retained about the first end 10a of the differential gear assembly 10 by the first bearing cap 28. The cylindrical bearing 40 thus supports the first end 10a of the differential gear assembly 10.

Still referring to FIG. 2, an inner tapered bearing 42 and an outer tapered bearing 44 are retained about the second end 10b of the differential gear assembly 10 by the adapter bearing cage. The adapter bearing cage 32 is retained on the carrier assembly 12 by the second bearing cap 30. The inner tapered bearing 42 and the outer tapered bearing 44 thus support the second end 10b of the differential gear assembly. The inner tapered bearing 42 and the outer tapered bearing 44 are generally known as the heel bearings, which in the preferred embodiment are matched tapered bearings. The retainer plate 36 is coupled to the second end lob of the differential gear assembly 10. All of the bearings 40, 42 and 44 include aligned inner and outer races.

Figure 3:
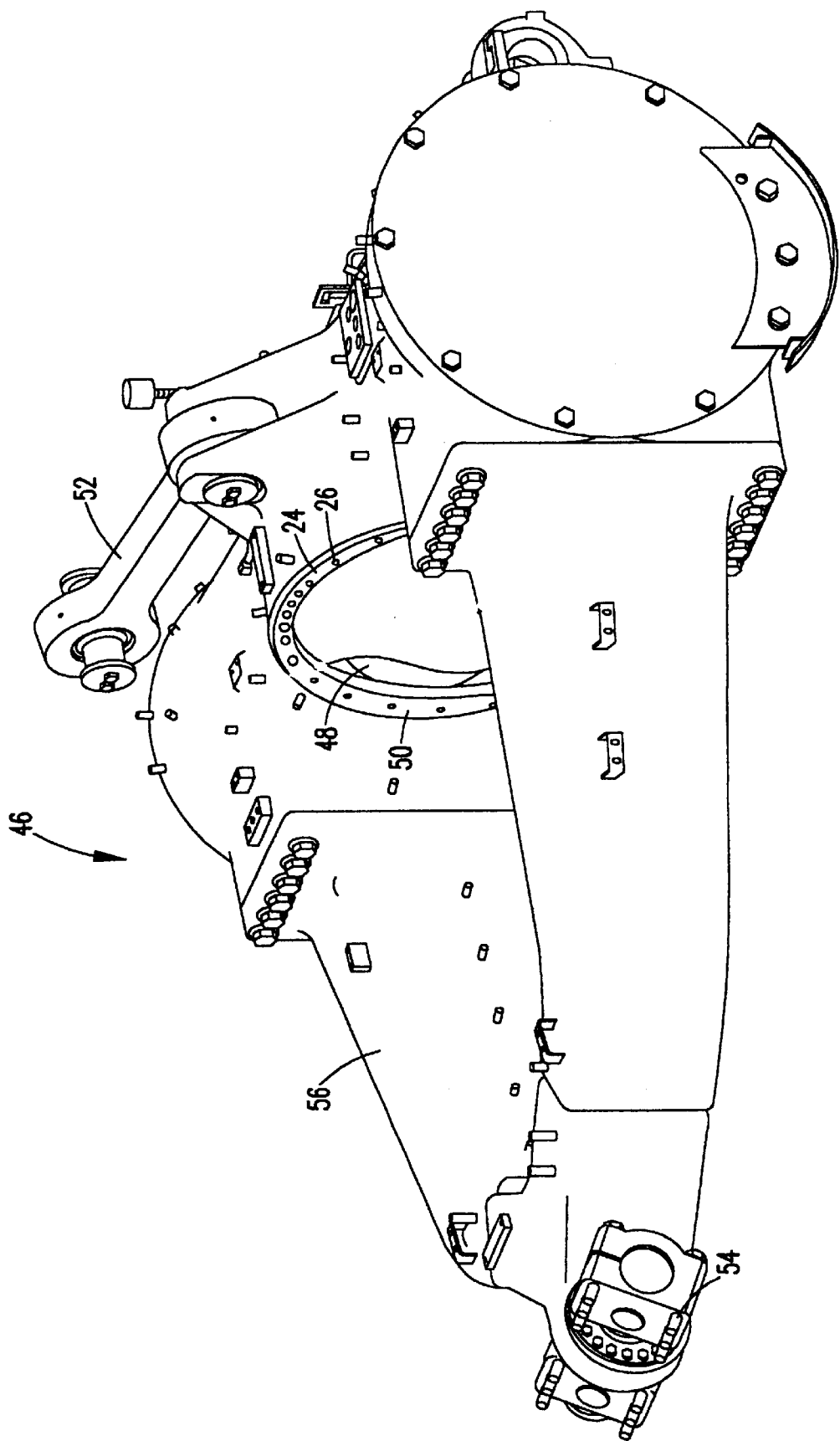
FIG. 3 shows a diagrammatic side plan view of a rear axle housing adapted for use with the present invention.

FIG. 3 shows a diagrammatic side plan view of a rear axle housing, generally depicted as reference numeral 46. The differential assembly 8 is fitted within a bore 48 of the rear axle housing 46. That is, the mounting plate 22 of the differential assembly 8 is bolted to the rear axle housing 46 via an alignment of the apertures 26 located on the flange 24 and apertures 50 surrounding the bore 48. The rear axle housing assembly 46 further includes a pivot arm 52 and a pivot mounting 54, both of which attach to the frame of a machine. The pivot mounting is pivotally connected to an "A" frame 56 extending from the rear axle housing 46.

Industrial Applicability

In operation, the arrangement of the cylindrical bearing 40 and the opposing tapered bearings 42 and 44 are maintained at an optimal load zone during driving conditions thus increasing the operating life of the differential assembly 8. More specifically, an output torque of the transmission shaft is provided to the bevel pinion gear 20. The torque is then transferred to the ring gear 16, which rotates with the differential gear assembly 10. The rotation of the differential gear assembly 10 results in the driving of the driving wheels.

The tapered bearings 42 and 44 and the cylindrical bearing 40 support the differential gear assembly 10 during the rotation of the differential gear assembly 10. During this rotation and due to the arrangement and configuration of the bearings 40, 42 and 44, the load zone of the cylindrical bearing 40 is not affected by bevel gear axial forces. That is, the inner and outer races of the cylindrical bearing 40 remain aligned (i.e., do not become misaligned due to external forces acting on the cylindrical bearing 40) during driving conditions. This is because the thrust load placed on the differential gear assembly 10 is capable of being handled by the tapered bearings 42 and 44 during the driving conditions. This, in turn, allows the load placed on the cylindrical bearing 40 to be shared evenly among the rollers of the cylindrical bearing 40.

The three bearing arrangement 40, 42 and 44 of the present invention also eliminates the need for a bearing preload adjustment process which may be applied by the first bearing cap 28 or the second bearing cap 30. This is partly because the tapered bearings 42 and 44 are a matched assembly, where a bearing pre-load adjustment process is eliminated, and both of the tapered roller bearings 42 and 44 are mounted in the same part of the differential gear assembly 10. This latter feature allows better control of the tolerances. In addition, the tapered bearings 42 and 44 have a "system life" which is relatively insensitive to bearing setting. Thus any loads placed on the bearings 40, 42 and 44, whether the loads be axial forces or other external loads, do not affect the alignment of the inner and outer races of the bearings 40, 42 and 44 during the driving operation. The result is that the cylindrical bearing 40 does not operate with a diminished load zone, where only a few rollers carry the entire load.

The present invention eliminates misalignment of roller bearings weather caused by improper bearing cap 30 adjustment, improper stop pin adjustment, or axial loading because both taperred roller bearings 42,44 are retained within the adapter bearing cage 32. This arrangement maintains proper pre-load even when the axial loading is enough to deflect the carrier assembly 12 at the location of the second bearing cap 30. Also this bearing arrangement ensures proper contact between the bevel pinion gear 20 and the bevel ring gear 16. Additionally most standard carrier assemblies 12 can be easily modified to use the present invention by machining appropriate surfaces to mate with the adapter bearing cage 32.

Other aspects and features of the present invention can be obtained from a study of the drawings, the disclosure, and the appended claims.

What is claimed is:

1. A differential assembly, comprising:
   a differential gear assembly having a first end and a second end;
   a cylindrical bearing supporting the first end of the differential gear assembly;
   a pair of tapered bearings supporting the second end of the differential gear assembly retained in an adapter bearing cage; and
   bearing caps for retaining the cylindrical bearing and the adapter bearing cage to the carrier assembly.

2. The differential assembly of claim 1, wherein the pair of tapered bearings are an inner tapered bearing and an outer tapered bearing are positioned on the second end of the differential gear assembly.

3. The differential assembly of claim 1 wherein the bearing caps include:
   a first bearing cap for retaining the cylindrical bearing; and
   a second bearing cap for retaining the adapter bearing cage.

4. The differential assembly of claim 3, including a carrier assembly, the first bearing cap and the second bearing cap being coupled to the carrier assembly.

5. The differential assembly of claim 3, wherein the adapter bearing cage is coupled to the second bearing cap.

6. The differential assembly of claim 3, wherein an inner diameter of the second bearing cap and the outer diameter of the adapter bearing cage are substantially equal.

7. The differential assembly of claim 3, including:
   a ring gear mounted on the on the differential gear assembly;
   a bevel pinion gear meshing with the ring gear, the bevel pinion gear being supported on the carrier assembly; and
   an inner and an outer tapered bearing for retaining the second end of the differential gear assembly on the assembly.

8. The differential assembly of claim 1, wherein the pair of tapered bearings are matched tapered bearings.

9. The differential assembly of claim 8, wherein the matched tapered roller bearings prevent misalignment of the cylindrical bearing when a thrust load is placed on the matched tapered roller bearings during driving conditions.

10. The differential assembly of claim 8, wherein the matched tapered roller bearings and the cylindrical bearing have an increase load zone during driving conditions.

11. A differential assembly comprising:
    a differential gear assembly having a first end and a second end;
    a ring gear mounted to the differential gear assembly;
    a carrier assembly;
    a cylindrical bearing supporting the differential gear assembly at the first end;
    a first bearing cap for retaining the cylindrical bearing about the first end of the differential gear assembly;
    an inner tapered bearing supporting the differential gear assembly at the second end;
    an outer tapered bearing positioned outward of the inner tapered bearing, the outer tapered bearing further supporting the second end of the differential gear assembly;
    an adapter bearing cage for retaining the inner and outer tapered bearings on the second end of the differential gear assembly; and
    a second bearing cap for retaining the adapter bearing cage about the second end of the differential gear assembly, the second bearing cap being mounted to the carrier assembly.

12. The differential assembly of claim 11, wherein the first bearing cap is mounted to the carrier assembly and the adapter bearing cage is mounted to an outer portion of the second bearing cap.

13. The differential assembly of claim 11, wherein the inner tapered bearing and the outer tapered bearing are matched tapered bearings.

14. The differential assembly of claim 11, wherein the matched tapered bearings prevent misalignment of the cylindrical bearing when a thrust load is placed on the matched tapered bearings during driving conditions.

15. A method of maintaining a load zone capacity in a differential assembly during driving conditions, comprising:

providing an output torque from an output shaft of a transmission to a differential gear assembly of the differential assembly, the differential gear assembly being supported by a cylindrical bearing and a pair of tapered bearings;

generating a thrust load on the differential gear assembly from the output torque of the transmission output shaft; and reducing axial forces on the cylindrical bearing caused by the thrust load by imparting the thrust load on the pair of tapered bearings thereby maintaining a shared load zone among rollers of the cylindrical bearing.

16. The method of claim 15, including maintaining an alignment of inner and outer races of the cylindrical bearing during the step of generating the thrust load.

17. A machine having a rear axle coupled to a differential assembly, comprising:

a rear axle housing having a bore;

a mounting plate mounted in the bore;

a bevel pinion gear supported on the carrier assembly within the rear axle housing;

a ring gear meshing with the bevel pinion gear;

a ring gear mounted on the differential gear assembly, the differential gear assembly having a first end and a second end;

a cylindrical bearing supporting the first end of the differential gear assembly;

a pair of tapered roller bearings supporting the second end of the differential gear assembly;

a first bearing cap for retaining the cylindrical bearing about the first end of the differential gear assembly;

an adapter bearing cage for retaining the inner and outer tapered bearings; and a second bearing cap for retaining the adapter bearing cage on a carrier assembly.

18. The machine of claim 17, wherein the adapter bearing cage is mounted to an outer surface of the second bearing cap.

19. The machine of claim 17, wherein the pair of tapered bearings are a matched pair of tapered roller bearings.

* * * * *